United States Patent Office 3,097,232
Patented July 9, 1963

3,097,232
PRODUCTION OF STYRENES AND STILBENES
Harold H. Zeiss, Werner Metlesics, and Minoru Tsutsui, Dayton, Ohio, assignors to Monsanto Chemical Company, St. Louis, Mo., a corporation of Delaware
No Drawing. Filed July 8, 1959, Ser. No. 825,636
11 Claims. (Cl. 260—475)

The present invention is directed to the process of preparing styrenes and stilbenes by reaction of arylchromium compounds and di-substituted acetylenes, particularly by the reaction of diaryl and triarylchromium compounds with di-substituted acetylenes.

The invention is further directed to the process of reacting diarylchromium and triarylchromium compounds with acetylenes substituted by electron-withdrawing groups, to obtain the corresponding α-aryl or α,α-diaryl olefins.

In another aspect the invention is directed to the process of reacting chromium halide, aryl Grignard reagent, and an acetylene containing no acidic hydrogen, and isolating aryl ethenes, i.e., styrenes and stilbenes, from the resulting reaction product; moreover, the aryl Grignard reagent can be prepared in situ from magnesium and aryl halides capable of forming Grignard reagents.

The diarylchromium and triarylchromium compounds utilized herein can be obtained by reaction of Grignard reagents with divalent or trivalent chromium compounds, and the organic portion of the chromium compounds can be any organic radicals capable of forming Grignard reagents. Specific procedures suitable for the preparation of aryl chromium compounds are described in the copending application of Harold H. Zeiss and Walter Herwig, S.N. 698,376, filed November 25, 1957, and now abandoned, and any of the procedures described therein, either generically or specifically, are also applicable here. It will be realized that effective catalysts can be produced in which the aryl radicals are modified by groups which do not prevent the production of Grignard reagents, this being particularly true in the case of inert substituents which do not change the fundamental hydrocarbon character of the radicals. Any aromatic halogen compounds are suitable so long as they do not contain active hydrogen atoms or other groups capable of causing extensive destruction of the Grignard reagents. Suitable aromatic halogen compounds are set forth in the aforesaid copending application S.N. 698,376. As the aryl radicals, mono-, di-, tri-, or polycyclic radicals are suitable, e.g., benzenes, naphthalenes, phenanthrenes, anthracenes, etc.; specific examples are phenyl, naphthyl, anthracyl, phenanthracyl, ethylphenyl, methylphenyl, mesityl, etc.

The process of the present invention is illustrated:

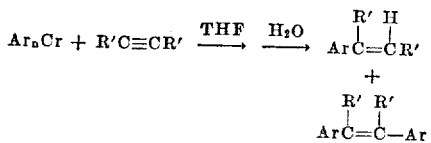

in which each R' represents a mono-valent organic radical, Ar represents an aryl radical, and n represents 2 or 3.

In order to promote the production of the desired substituted styrenes and stilbenes, it is desirable that only 1 mole of the acetylene be present for each mole of arylchromium, and in fact, it is preferred that excess triarylchromium be present, for example, 2 to 10 or more moles of, for example, triarylchromium for each mole of the acetylene, to insure against further condensation of the acetylene molecules which would cause the production of substituted benzenes and naphthalenes rather than the desired substituted styrenes and stilbenes. However some of the styrene and stilbene products are produced even though as much as 5 or more moles of the acetylene is employed per mole of triarylchromium. The proportions of reactants are not as important when acetylene reactants containing electron-withdrawing groups, such as carboxyl groups, phenyl groups, etc., are employed, for the electron-withdrawing groups are effective in delocalizing the acetylenic π electrons, thereby favoring the addition reaction to styrenes and and stilbenes rather than condensation to cyclic structures, even though excess of the acetylene reactant is present.

The polymerization reactions of the present invention are generally conducted in the presence of tetrahydrofuran, but any other fairly basic Grignard solvent capable of complexing the divalent or trivalent chromium compounds to assure a fairly stable form thereof for reaction would be suitable.

Whenever chromium halide is utilized in the reactions herein, it is generally advantageous to employ it in the form of its tetrahydrofurante in order to have it in an organic solvent-soluble form. The chromium halide tetrahydrofuranates and their preparation are described and claimed in the aforesaid copending application S.N. 698,376. As the chromium halide component, $CrCl_3$, $CrCl_2$, $CrBr_3$, $CrBr_2$, $CrI_3$ and $CrI_2$ are very suitable.

One especially notable aspect of the present process is the fact that it is possible to react the reagents utilized in preparing the aryl chromium catalyst, including even the magnesium turnings or powder in the same reaction vessel with the di-substituted acetylene compound, and obtain the substituted styrenes and stilbenes.

The importance and value of our invention lies in the fact that it provides a new route to styrenes and stilbenes. This will probably be of most importance in the preparation of various substituted styrenes and stilbenes, as the process makes it feasible to prepare styrenes and stilbenes from any aryl compounds capable of being converted to Grignard derivatives, and variation of the di-substituted acetylenes provides a further means of varying the substituents.

For an acetylene to be converted to styrenes or stilbenes according to the present invention, it is necessary that it be di-substituted. Any alkynes other than 1-alkynes are suitable for such purpose, for example non-alpha alkynes of 4 to 20 or more carbon atoms, particularly the non-alpha alkynes of 4 to 10 carbon atoms. Suitable alkynes, are, for example, those di-substituted acetylenes in which the substituents are straight or forked-chain alkyl radicals, e.g., methyl, ethyl, n-propyl, isopropyl, n-butyl, isobutyl, sec-butyl, t-butyl, n-pentyl and each of its isomers, n-hexyl, n-heptyl, n-octyl, 2-ethylhexyl, nonyl, decyl, dodecyl, tridecyl (from Oxo process), octadecyl, eicosyl, etc., or cyclo alkyl radicals, e.g., cyclohexyl, cyclopentyl, etc. In addition, aryl substituents are suitable and in fact, promote the desired reaction because of their electron-withdrawing activity; for example, acetylenes can be employed containing such aryl radicals as substituents as phenyl, naphthyl, anthracyl, phenanthracyl, ethylphenyl, methylphenyl, mesityl, etc. As specific examples of non-alpha alkynes and other di-substituted acetylenes suitable for conversion to substituted styrenes and stilbenes, the following can be mentioned: 2-butyne, 2-pentyne, 2-hexyne, 3-hexyne, 2-octyne, 3-octyne, 2,2-dimethyl-3-hexyne, 2-methyl-3-heptyne, 5-decyne, 4-dodecyne, 6-hexadecyne, 2-eicosyne, dicarbethoxyacetylene, diphenylacetylene, α-phenyl-β-methylacetylene, α-phenylmethyl-β-methylacetylene, di-α-naphthylacetylene, 1-anthracylpropyne, p-tolylethylpropyne di-p-tolylacetylene, α-xylyl-β-methylacetylene, etc.

It is often desirable to employ acetylenes having strongly electron-attracting groups as substituents, e.g., such groups as $CF_3$, $-CO_2R$, $-CS_2R$, etc., in which R represents any monovalent, esterifying radical, for example, alkyl or aryl radicals of up to 10 or more carbon atoms; phenyl and p-nitrophenyl groups also have this property to some extent and can be employed. Any other strongly electron-attracting groups, of which many are known to the art, can be employed as desirable substituents in the acetylene reactant, so long as such substituents do not interfere in the desired reaction. Such electron attracting groups can be employed as substituents on both of the acetylenic carbons, or can be employed in combination with alkyl, aryl or other substituents.

In general the reactions described herein, as exemplified by the homogeneous reaction of triphenylchromium tri-tetrahydrofuranate with dimethylacetylenedicarboxylate, and also trimesitylchromium tri-tetrahydrofuranate with 2-butyne, take place fairly rapidly circa room temperature. The reactions are ordinarily followed by hydrolysis, and removal of the desired products from the resulting aqueous phase by suitable means such as filtration, or extraction with an organic solvent, e.g., ether or benzene. The isolation of the styrenes or stilbenes can then be completed by fractional distillation or crystallization.

The following examples are illustrative of certain embodiments of the invention.

*Example 1*

A solution of 0.01 mole of chromium trichloride tri-tetrahydrofuranate in 100 ml. tetrahydrofuran was treated with 0.03 mole of mesitylmagnesium bromide within a period of two hours, resulting in the formation of a blue solution of trimesitylchromium in tetrahydrofuran. At room temperature 3 ml. of 2-butyne was added, and, after an induction period of one hour, an exothermic reaction was observed. The mixture was then stripped of solvent and hydrolyzed by addition of ice water. The ether extract of the aqueous mixture yielded a low boiling hydrocarbon which was distilled between 55–58°/0.4 mm., $n_D^{25}$ 1.5129, and whose infrared, ultraviolet, and Raman spectra were consistent with the assignment of the formula, 2-mesityl-2-butene, (I) (or $\alpha,\beta,2,4,6$-pentamethylstyrene), to it.

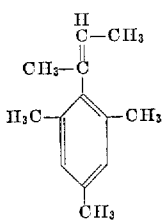

I

*Anal.*—Calcd. for $C_{13}H_{18}$: C, 89.59; H, 10.41. Found: C, 89.79; H, 10.30.

Repetition of the reaction using 0.033 mole of the insoluble chromic trichloride and 0.09 mole of mesitylmagnesium bromide in tetrahydrofuran followed by addition of 5.35 g. of 2-butyne gave a ten-minute induction period prior to exothermic reaction and development of a black-red-brown mixture. After twelve hours standing, the reaction mixture was worked up as described above. Distillation at 0.3 mm. of the reaction products gave a yellow oil distilling between 40–80°, and between 80–100° a crystalline fraction which was identified as hexamethylbenzene. The yellow oil was redistilled between 103–112° at 12 mm. giving 2 g. of the 2-mesityl-2-butene, (I) $n_D^{25}$ 1.5116, and a non-crystallizing, unidentified liquid distilling between 120–200°. The substituted styrene (0.75 g.) was oxidized over a long period in 15 ml. of benzene containing 0.6 g. of osmium tetraoxide and 1 ml. of pyridine. The solution was then concentrated to one-half its original volume and shaken with 50 ml. of an aqueous solution containing 0.5 g. of potassium hydroxide and 5 g. of mannitol. After washing the organic layer, the solvent was evaporated to give white needles of 2-mesitylbutan-2,3-diol, (II), which after recrystallization from ether-petroleum ether melted between 110–112°.

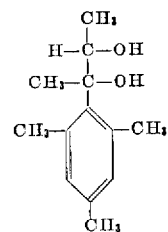

II

*Anal.*—Calcd. for $C_{13}H_{20}O_2$: C, 74.96; H, 9.68; MW, 208. Found: C, 75.62; H, 9.91; MW, 209.

The diol (0.45 g.) in 5 ml. of benzene was cleaved with 0.12 g. of lead tetraacetate. Acetaldehyde was detected by distilling it directly from the reaction mixture into an ethanolic solution of 2,4-dinitrophenylhydrazine. The 2,4-dinitrophenylhydrazone needles which separated were recrystallized from ethanol, M.P. 158–160°, and gave no depression when melted with an authentic sample of this acetaldehyde derivative. Comparison of X-ray diffraction powder diagrams confirmed its identity. The remainder of the lead tetraacetate treated solution above was extracted now with ether. The extracted liquid when freed of solvent ether gave an infrared spectrum consistent with the expected compound from the cleavage, 2,4,6-trimethylacetophenone.

*Example 2*

A 0.0225 molar solution of triphenylchromium in tetrahydrofuran was prepared as previously described. At room temperature, the dark red solution was treated with 3.1 g. (0.0220 mole) of dimethyl acetylenedicarboxylate (Farchan). The temperature of the solution rose spontaneously to 45° and then was maintained at 35° for twenty hours, after which the tetrahydrofuran was removed in vacuo, the residue hydrolyzed with ice water and filtered. The water phase, containing phenol (odor), was discarded, and the solid remaining on the filter was dried and then extracted into benzene. The latter solution yielded 0.35 g. of crystalline dimethyldiphenylmaleate which after two recrystallizations from methanol melted between 110–112° (lit., 110–111°).

*Anal.*—Calcd. for $C_{18}H_{16}O_4$: C, 72.96; H, 5.44; $OCH_3$, 21.0. Found: C, 74.42; H, 5.45; $OCH_3$, 21.0.

The maleate ester was hydrolyzed in alcoholic alkali solution which on acidification deposited diphenylmaleic anhydride (cis configuration), M.P. 158–160°, which melted undepressed with an authentic sample.

*Example 3*

$CrCl_2$ in tetrahydrofuran was treated with approximately a 2-molar proportion of mesitylmagnesium bromide and to the resulting solution of dimesitylchromium, dimethyl acetylenedicarboxylate was added in ratio of 8 moles of the acetylene to 1 of the dimesitylchromium. After reaction had occurred, the product was hydrolyzed, and methyl mellitate and dimethyl dimesitylethylenedicarboxylate were isolated.

We claim:

1. The process of preparing aryl ethenes which comprises mixing aryl chromium compounds selected from the group consisting of daryl chromium and triaryl chromium with di-substituted acetylenes selected from the group consisting of diphenyl acetylene, non-alpha alkynes of 4 to 10 carbon atoms and alkyl and aryl diesters of acetylene-dicarboxylic acid, the alkyl and aryl groups containing up to 10 carbon atoms, and isolating aryl ethenes from the resulting reaction mixture, the term aryl in every occurrence meaning a monovalent aromatic hydrocarbon radical in which the valence bond is located on an aromatic carbon atom.

2. The process of preparing aryl ethenes which comprises treating chromium halide in tetrahydrofuran with arylmagnesium halides and di-substituted acetylenes se-selected from the group consisting of diphenyl acetylene, non-alpha alkynes of 4 to 10 carbon atoms and alkyl and aryl diesters of acetylene-dicarboxylic acid, the alkyl and aryl groups containing up to 10 carbon atoms, and isolating aryl ethenes from the reaction mixture, the term aryl in every occurrence meaning a monovalent aromatic hydrocarbon radical in which the valence bond is located on an aromatic carbon atom.

3. The process of claim 2 in which the di-substituted acetylene is a non-alpha alkyne of 4 to 10 carbon atoms.

4. The process of claim 2 in which the di-substituted acetylene is diphenyl acetylene.

5. The process of claim 2 in which the arylmagnesium halide is mesitylmagnesium bromide.

6. The process of claim 2 in which the arylmagnesium halide is phenylmagnesium bromide.

7. The process of claim 2 in which the di-substituted acetylene is an alkyl diester of acetylene dicarboxylic acid, the alkyl group containing up to 10 carbon atoms.

8. The process of claim 2 in which the chromium halide is $CrCl_3$.

9. The process of preparing 2-mesityl-2-butene which comprises contacting trimesitylchromium in tetrahydrofuran with 2-butene, hydrolyzing the reaction product, and distilling the 2-mesityl-2-butene.

10. The process of preparing esters of diphenylmaleic acid which comprises contacting triphenylchromium in tetrahydrofuran solution with an alkyl dietser of acetylene dicarboxylic acid, the alkyl group containing up to 10 carbon atoms and hydrolyzing the resulting reaction product to obtain the esters of diphenylmaleic acid.

11. The process of claim 1 in which the aryl chromium compound is triaryl chromium in which the aryl group is monocyclic and the triaryl chromium is employed in an amount of 2 to 10 moles per mole of the disubstituted acetylene and the process is carried out in tetrahydrofuran.

References Cited in the file of this patent
UNITED STATES PATENTS

| | | |
|---|---|---|
| 2,718,533 | Smolin | Sept. 20, 1955 |
| 2,734,928 | Smolin | Feb. 14, 1956 |
| 2,951,882 | Lowe | Sept. 6, 1960 |

UNITED STATES PATENT OFFICE
CERTIFICATE OF CORRECTION

Patent No. 3,097,232                      July 9, 1963

Harold H. Zeiss et al.

It is hereby certified that error appears in the above numbered patent requiring correction and that the said Letters Patent should read as corrected below.

Column 1, line 17, for "α,α-" read -- α,á- --; column 2, line 19, for "tetrahydrofurante" read -- tetrahydrofuranate --; column 4, line 64, for "daryl" read -- diaryl --; column 5, line 1, strike out "se-"; column 6, line 7, for "dietser" read -- diester --.

Signed and sealed this 7th day of January 1964.

(SEAL)                                             EDWIN L. REYNOLDS
Attest:
ERNEST W. SWIDER Acting Commissioner of Patents Attesting Officer